United States Patent [19]
Pitts

[11] Patent Number: 5,946,690
[45] Date of Patent: Aug. 31, 1999

[54] NDC CONSISTENCY RECONNECT MECHANISM

[75] Inventor: William M. Pitts, Los Altos, Calif.

[73] Assignee: INCA Technology, Inc., Los Altos, Calif.

[21] Appl. No.: 08/991,156

[22] Filed: Dec. 16, 1997

Related U.S. Application Data

[60] Provisional application No. 60/033,462, Dec. 17, 1996.

[51] Int. Cl.$^6$ .............................. G06F 17/30; G06F 12/00
[52] U.S. Cl. .......................... 707/10; 707/201; 707/205; 711/145; 711/113; 711/130
[58] Field of Search ........................... 707/10, 201, 205; 711/113, 130, 145

[56] References Cited

U.S. PATENT DOCUMENTS

| | | | |
|---|---|---|---|
| 4,422,145 | 12/1983 | Sacco et al. | 711/160 |
| 4,463,424 | 7/1984 | Mattson et al. | 74/136 |
| 4,694,396 | 9/1987 | Weisshaar et al. | 395/200.03 |
| 4,714,992 | 12/1987 | Gladney et al. | 707/206 |
| 4,897,781 | 1/1990 | Chang et al. | 707/201 |
| 4,975,830 | 12/1990 | Gerpheide et al. | 395/200.58 |
| 5,001,628 | 3/1991 | Johnson et al. | 707/10 |
| 5,056,003 | 10/1991 | Hammer et al. | 395/680 |
| 5,058,000 | 10/1991 | Cox et al. | 707/10 |
| 5,077,658 | 12/1991 | Bendert et al. | 707/1 |
| 5,109,515 | 4/1992 | Laggis et al. | 707/10 |
| 5,113,519 | 5/1992 | Johnson et al. | 707/201 |
| 5,133,053 | 7/1992 | Johnson et al. | 395/200.53 |
| 5,155,808 | 10/1992 | Shimizu | 395/200.32 |
| 5,224,205 | 6/1993 | Dinkin et al. | 395/200.56 |
| 5,261,069 | 11/1993 | Wilkinson et al. | 711/145 |
| 5,611,049 | 3/1997 | Pitts | 707/8 |
| 5,649,102 | 7/1997 | Yamauchi et al. | 345/200.43 |
| 5,680,571 | 10/1997 | Bauman | 711/122 |
| 5,764,972 | 6/1998 | Crouse et al. | 707/1 |
| 5,809,527 | 9/1998 | Cooper et al. | 711/133 |
| 5,819,292 | 10/1998 | Hitz et al. | 707/203 |

*Primary Examiner*—Thomas G. Black
*Assistant Examiner*—Sanjiv Shah
*Attorney, Agent, or Firm*—Donald E. Schreiber

[57] ABSTRACT

A client (24) in a digital computer network that employs server-driven consistency accesses a file (26) that a caching site (22) supplies from an image of the file (26) projected from a server (28). When the file (26) becomes inactive, the site (22) saves the file onto local permanent storage together with file metadata. A subsequent request to the site (22) to access the file (26) retrieves from local storage the metatadata, including a file-last-write-time attribute. The caching site (22) compares the locally retrieved file-last-write-time attribute with a server supplied file-last-write-time attribute. If the two attributes are identical, then the caching site: 1. reconnects to the projected file image present in storage at the site (22); 2. re-establishes server-driven consistency over the projected file image at the caching site (22); and 3. uses data from the file image retrieved from local storage to respond to a subsequent read request from the client (24).

2 Claims, 21 Drawing Sheets

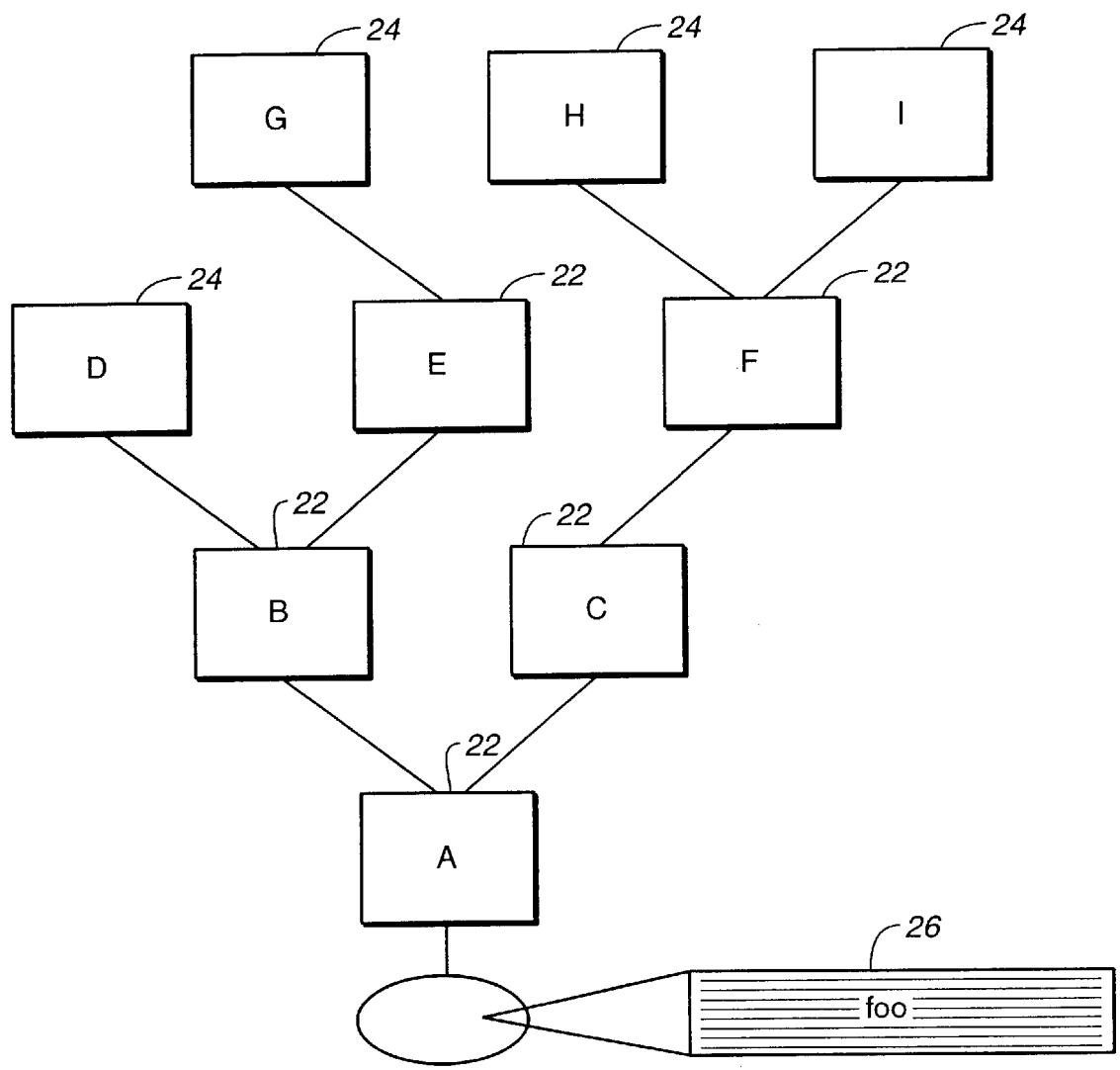
FIG._1

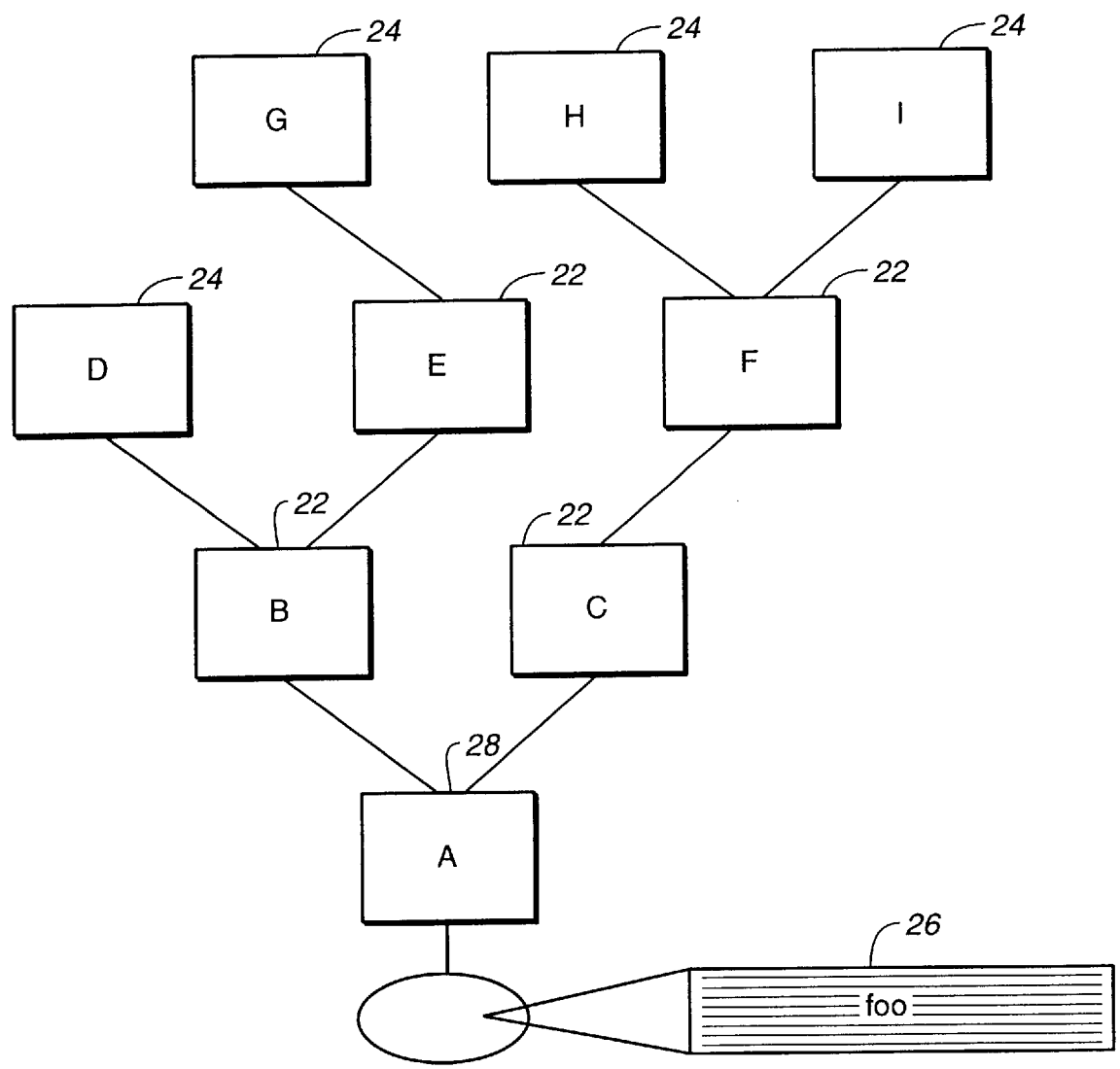
FIG._2

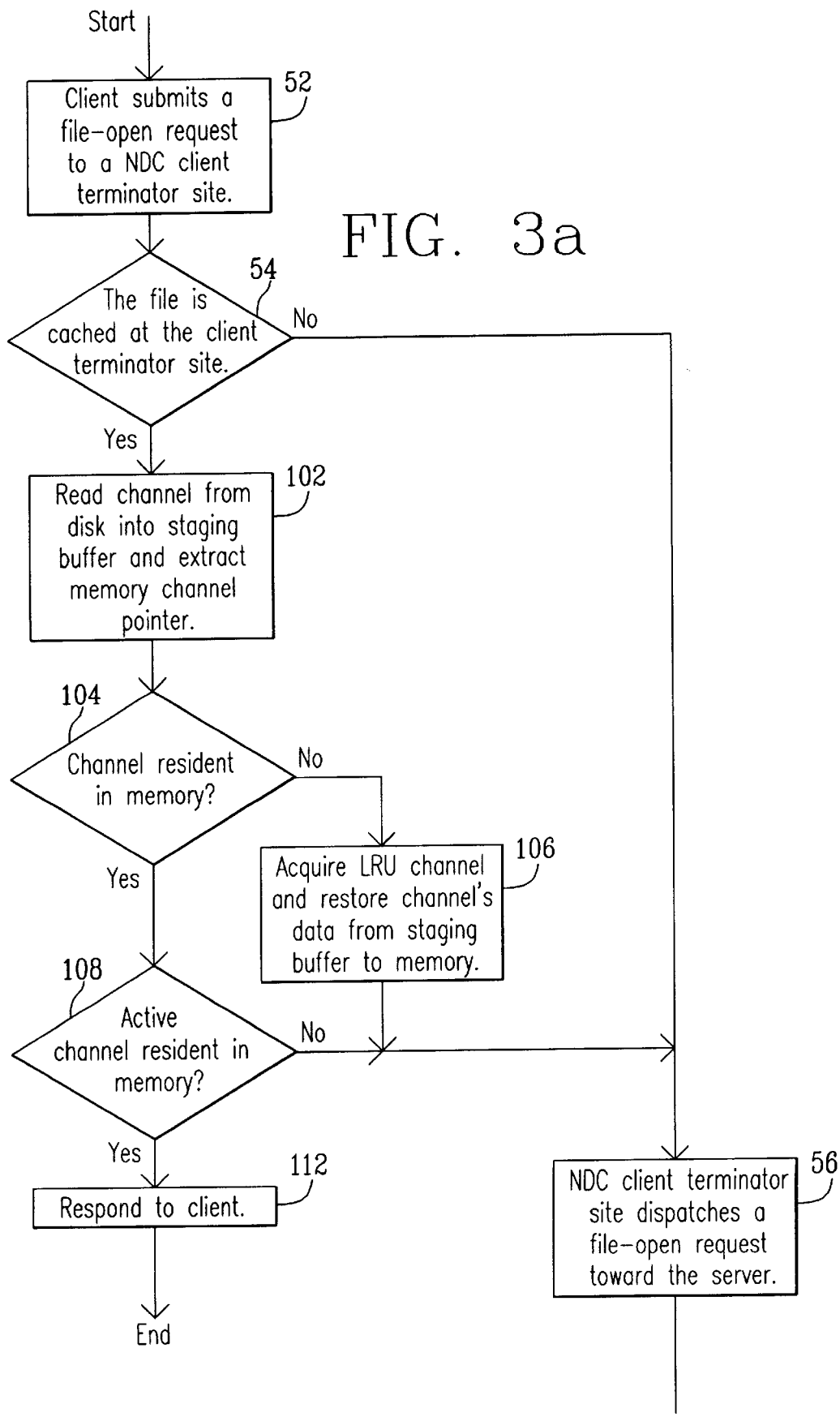

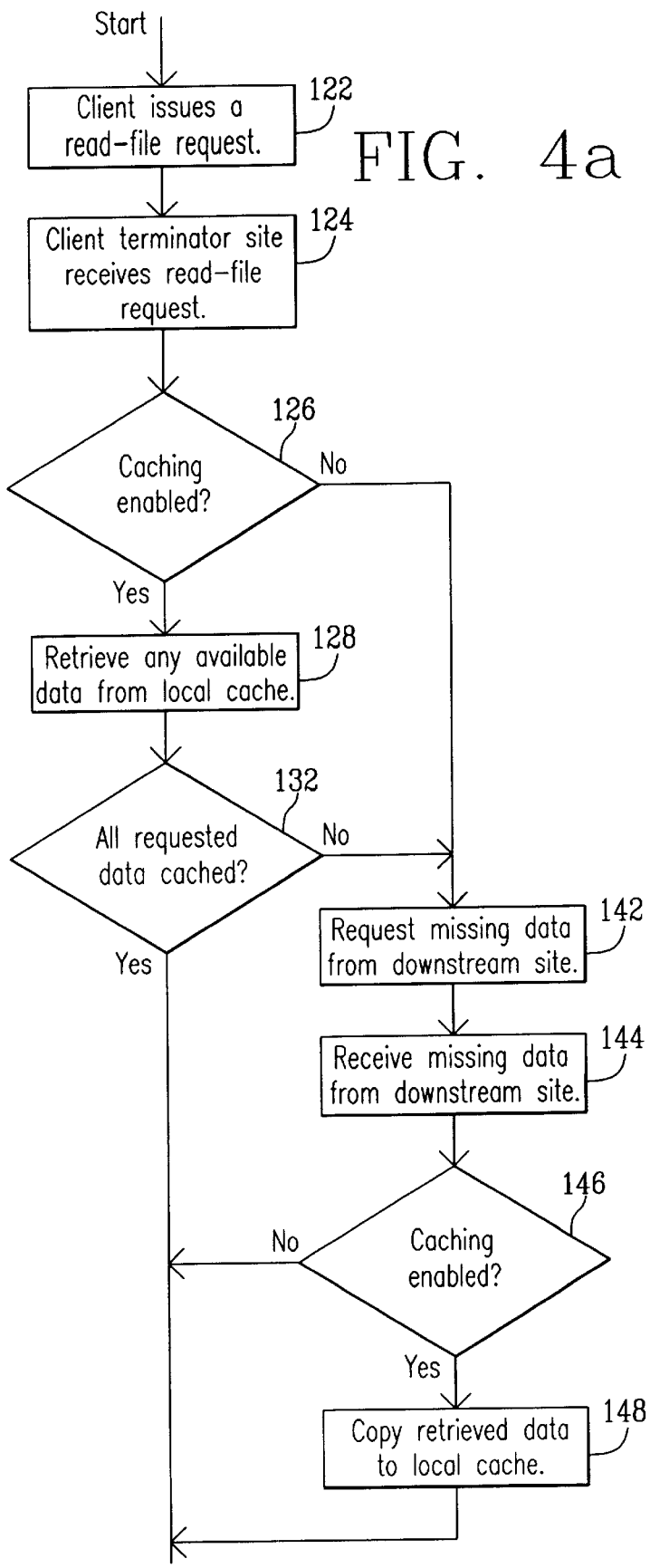
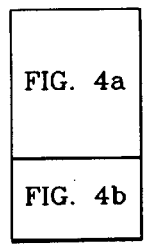
FIG. 4a
FIG. 4

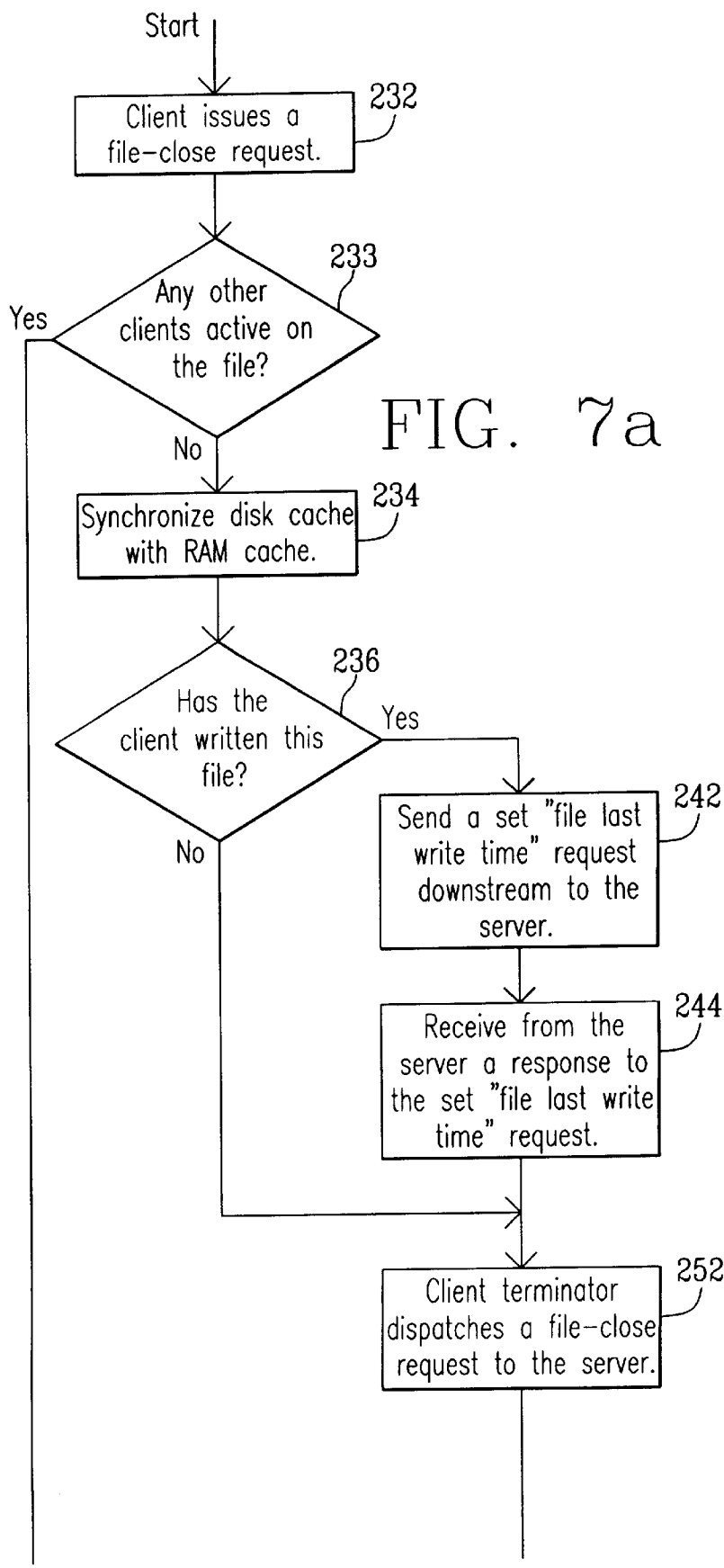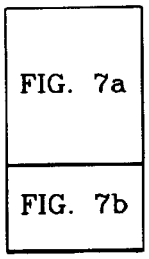
FIG. 7a

FIG. 8a

```
/******************************************************************
 *
 * NAME:
 * $Workfile: Ca.h $
 * DESCRIPTION/
 * CONTENTS:
 *
 * PROPRIETARY RIGHTS NOTICE
 * This material contains the valuable proprietary and trade
 * secret information of Inca Technology, Inc. of Milpitas, California.
 * No part of such information may be disclosed, used, reproduced
 * or transmitted in any form or by any means -- electronic,
 * mechanical, or otherwise -- including photocopying and recording
 * in connection with any information storage or retrieval system,
 * without permission in writing from Inca Technology, Inc.
 *
 * COPYRIGHT NOTICE
 * Copyright (c) 1997
 * Inca Technology, Inc
 * Milpitas, Ca, 95035
 * All rights reserved.
 *
 ******************************************************************/ include "Time.h"
include "Tsk.h"
#include "Net.h"

extern BOOL      DdsCaFatHack;    // hack for running on FAT extern __int32   PageSize;
extern __int32   PageMask;
extern __int64   dwPageMask;

class DdsCaChl;
class DdsCaSeg;
class DdsSmbReq;
class DdsAdmShare;

enum DdsCaOplock {
    DDS_CA_OPLOCK_NONE = 0,          // no oplock
    DDS_CA_OPLOCK_READ = 1,          // read (Level II) oplock
    DDS_CA_OPLOCK_EXCL = 0x7ffffffe, // write (Level I) or batch oplock
                                     // (for our purposes they are equivalent)
};

//======================================================================
// DdsCaAllOplocks maintains information about all oplocks associated with
// a channel. The channel may either have no oplocks, one exclusive oplock,
// or many read oplocks. This structure maintains that information.
//
// OPLOCK OVERVIEW:
//
// Oplocks are owned by a particular fid, but they qualify the data in
```

FIG. 8b

```
// the cached file. Since each cached file can have many fids, things
// get confusing. Sometimes SRV is clever and only sends a
// single oplock break message to break many read oplocks in the same client,
// but sometimes SRV is silly and sends a message to each fid.
// We must handle both situations.
//
// An open request seems to always return an oplock of some kind. If this
// is the only open for a file, then SRV returns a batch oplock. Otherwise,
// SRV returns a read oplock.
//
// Oplocks are never upgraded, but they are downgraded by several actions.
// An additional open will downgrade a batch or write oplock to a read oplock.
// A write will downgrade all read oplocks to none (including the writer).
// SRV can (and sometimes does) avoid sending oplock break messages if
// the action causing the break came from the oplock break message's destination
// or if SRV already sent an oplock break message to that destination for
// a different fid associated with the same file.
//
// Closing the fid releases the oplock owned by that fid. An oplock is
// owned by the fid whose open created the oplock. A downgraded oplock
// is owned by the same fid as the original oplock. Not all fids in
// the same client will have the same oplock state. There may be a combination
// of read oplocks and none oplocks or a combination of one exclusive oplock
// and many none oplocks. Regardless of what other fids might need an oplock,
// closing the owner fid always releases the oplock.
//
// OPLOCKS AND DEADLOCK
//
// Since the oplock break task must acquire the channel and other tasks
// may have already acquired the channel waiting for a response from
// the source (which may be deferred until the oplock break is acknowledged),
// there is potential for deadlock. Fortunately, I believe we have
// all scenarios covered.
//
// When breaking a read oplock to no oplock there is no acknowledgement,
// so there is no deadlock risk. There is a race condition where clients
// may read invalid data, but we minimize this risk by sending the oplock
// break through to the client before acquiring the channel. Additionally,
// the task which acquires and invalidates the channel runs at a higher
// than normal priority.
//
// When breaking an exclusive oplock to a read oplock (or no oplock) the
// client acknowledges by writing dirty data and either sending an oplock
// break response or just closing the file, so there is potential for deadlock.
// There are only a few types of SMBs
// which acquire the channel: open, read, write, close, and oplock break.
// The open task doesn't acquire the channel until it receives a response,
// so it won't deadlock. The read, write, and close tasks must be coming
// from the exclusive oplock owner, because they require an fid and only
// one fid can exist for an exclusive oplock. The server cannot defer
// write and close SMBs, because these are required to acknowledge the oplock
// break. So write and close won't deadlock. The only remaining candidate
// is read, but through experimentation I verified that the server doesn't
// defer reads when waiting for an oplock break acknowledgement.
```

// So I think we are safe from oplock related deadlocks.
//
// CLASS OVERVIEW
//
// This class is meant to handle all this confusing stuff in a simple and thread
// safe way. For an open, the SMB code creates a fid entry, acquires the
// channel, and inserts the oplock with Insert(). The function returns by
// reference the count of oplock breaks to read and none. For the close,
// the fid entry call Release() which compares these original counts to see
// if the original state of the oplock was broken and no longer needs to be released.
// Decoupling the fid entries and the channels in this way
// allows oplock breaks to happen without synchronizing with the threads
// owning the fid entries. All decisions about data validity should be based
// on AllOplocks which is just a number reflecting the number and type of oplocks
// without knowing the fids who own those oplocks.
//
// NOTE: Release is called without acquiring exclusive access to the channel,
// so these member functions must handle threading issues.

FIG. 8c

```
class DdsCaAllOplocks { public:

DdsCaAllOplocks() : AllOplocks(0), LastBreakToRead(0), LastBreakToNone(0) {}

DdsCaOplock    Get() const;
    void           Insert(DdsCaOplock Oplock,
                          ULONG* LastBreakToRead_,
                          ULONG* LastBreakToNone_);
    void           Remove(DdsCaOplock Oplock,
                          ULONG LastBreakToRead_,
                          ULONG LastBreakToNone_);
    void           BreakToRead();
    void           BreakToNone();

static void    Init();
private:

long              AllOplocks;         // all current oplocks for this channel
    ULONG             LastBreakToRead;    // tick count of last break to read oplock
    ULONG             LastBreakToNone;    // tick count of last break to none oplock static CRITICAL_SECTION   Cs;         // critical section
};
```

//==================================================================
// DdsCaChl represents a cached file define DDS_CA_VERSION_BASE (0xCA00)
define DDS_CA_VERSION      (DDS_CA_VERSION_BASE + 1)

class DdsCaChl { public:

friend class DdsCaSeg;

DdsCaChl()
{
   Version = DDS_CA_VERSION;
   MetaH   = 0;
   FileH    = 0;
   FileMapH = 0;

RefCnt  = 0;
   SegCnt  = 0;
   SegHead = 0;
   MapSize = 0;
   FileSize = 0;

WriteTime.SetZero();
   Flags   = 0;
}

FIG. 8d

// given unicode path, find and reference the channel
// The returned pointer to the channel will be valid until unreferenced.
// NOTE: These three (plus AllOplocks.Release) are the ONLY member functions
// which may be called without acquiring exclusive access to the channel.

// For this reason, they must be thread safe.

static DdsCaChl*   FindAndRef(DdsAdmShare* Share, const WCHAR* Path);
void              Ref();
void              unref();

// any request which specifies a FID should first call StartAcquire()
// (asynchronously), then CompleteAcquire(), then process the SMB,
// then call Release() when done.

void              StartAcquire(DdsTskThrSafeMutexCall* Done);
void              CompleteAcquire();
void              Release();

// thread may use the synchronous acquire if they can safely block void Acquire()
{
   Mutex.Wait();
   CompleteAcquire();
}

// given file offset and fen, return a list of segments describing ranges
// mapped into virtual memory. It is the responsibility of the caller
// to examine these segments and generate read requests to the source
// server to make invalid segments valid.
// There are three different forms of this function:
//
//    Read()     -- GetSegs( offset, length, SegReadAwait, ... )

```
// Write()    -- GetSegs( offset, length, SegWriteAwait )
// PreFetch() -- GetSegs( offset, length, SegPreFetched )
//
// Read() requires some extra hints about future reads and
// returns a suggested amount to prefetch beyond the amount needed.
// PreFetch() and Write() are really equivalent, but have different names
// to enhance readability. All these functions set the appropriate flags
// on the segments returned:
//
//     read      -- SegInvalid | SegReadAwait
//     write     -- SegInvalid | SegWriteAwait
//     prefetch  -- SegInvalid | SegPreFetched
//
// NOTE: The function may fail (returning FALSE) if it is not able to
// create the mapped file views. This may happen if there is no more
// disk space or address space.

BOOL        GetSegs(DWORDLONG FileOfs, ULONG Len, USHORT flags,
                ULONG Remaining, BOOL IsSequential, ULONG* PreFetchLenP);

// for maintaining all oplocks associated with a channel

DdsCaAllOplocks    AllOplocks;

// for accessing last write time recorded on source server

DdsTime     GetWriteTime() const;
void        SetWriteTime(DdsTime Time, BOOL IsCoarse = FALSE);
BOOL        IsWriteTimeCoarse() const;

// for accessing file size on source server

DWORDLONG   GetSize() const;
void        SetSize(DWORDLONG Size);

// invalidate cached data void        Invalidate();
ULONG       Version;    // version number of disk storage format DdsCaChlMutex    Mutex;     // mutex to sequence channel access
DdsCaSeg         *SegHead;  // segment chain ptr (ordered by file offset)

// File & File Mapping Handles

HANDLE      FileH;      // 'filexxx' file handle
HANDLE      MetaH;      // 'filexxx:6META$' file handle
HANDLE      FileMapH;   // 'filexxx' file mapping handle long        RefCnt;     // cannot be replaced while referenced
USHORT      SegCnt;
DWORDLONG   MapSize;
DWORDLONG   FileSize;
```

FIG. 8e

```
    DdsTime         WriteTime;
    ULONG           Flags;
    enum {

IS_WRITE_TIME_COARSE = (IU<<0)
};
```

FIG. 8f

```
    BOOL            MapCacheFile( __int64 size );
    void            GetSegsWithinPage( DWORDLONG FileOfs, ULONG Len, USHORT flags );
    void            SplitSegs( DWORDLONG FileOfs, ULONG Len );
    void            CoalesceSegs();
    BOOL            IsAnySegInPageInsideRange( DdsCaSeg* MinP, DdsCaSeg*& MaxP,
DWORDLONG FileOfs, ULONG Len );

BOOL            MapAndUnmapViews( DWORDLONG FileOfs, ULONG Len );

void            SetBufs( DWORDLONG FileOfs, ULONG Len, DdsNetBufDesc* Bufs, DWORD*
BufCntP );
    void            SetValid( DWORDLONG FileOfs, ULONG Len );

__int64         FreeUpDiskSpace();
};

//==================================================================
// DdsCaSeg represents a segment of a cached file. The segment may or may not
// be mapped into memory, and the segment may or may not contain valid data.

// DdsCaSeg.Flags:

#define SegReadAwait      0x0001  // segment expecting READ data
#define SegWriteAwait     0x0002  // segment expecting WRITE data
#define SegDirty          0x0004  // segment is DIRTY
define SegFlushed        0x0008  // segment is being FLUSHed define SegInvalid        0x0010  // segment is INVALID (it may or may NOT be mapped)
define SegReserved       0x0020  // segment is RESERVED
define SegPinned         0x0040  // segment is PINNED define SegConjured       0x0100  // segment was originally CONJURED
define SegPreFetched     0x0200  // segment was originally PREFETCHED
#define SegReadAccessed   0x0400  // segment has been ACCESSED: READ
define SegWriteAccessed  0x0800  // segment has been ACCESSED: WRITE define SegAny            0xffff  // any SEG flag will do class DdsCaSeg { public:

char* GetAddr(
    )
```

```
        return (char*)Vaddr + Offset % PageSize;
    }
    DWORDLONG GetMaxOffset()
    {
        return Offset + Length - 1;
    }
    DWORDLONG SegStart()
    {
        return Offset;
    }
    DWORDLONG SegNextStart()
    {
        return Offset + Length;
    }
    DWORDLONG ViewStart()
    {
        return Offset & ~dwPageMask;
    }
    DWORDLONG ViewEnd()
    {
        return (Offset & ~dwPageMask) + PageSize - 1;
    }
    BOOL Contains(DWORDLONG Ofs)
    {
        return Offset <= Ofs && Ofs <= GetMaxOffset();
    }
    BOOL AtLeastPartiallyContains(DWORDLONG Ofs, ULONG Len)
    }
        // segment includes either endpoint of range or range surrounds segment
        return (  ( Offset <= Ofs       &&         Ofs <= GetMaxOffset() )
            || ( Offset <= Ofs+Len-1 &&    Ofs+Len-1 <= GetMaxOffset() )
            || (   Ofs <= Offset   && GetMaxOffset() <= Ofs+Len-1     ) );
    }
    BOOL CompletelyContains(DWORDLONG Ofs, ULONG Len)
    {
        return Offset <= Ofs && Ofs+Len-1 <= GetMaxOffset();
    }
    BOOL Viewable(DWORDLONG Ofs)
    {
        return ViewStart() <= Offs && Ofs <= ViewEnd();
    }
    BOOL CompletelyViewable(DWORDLONG Ofs, ULONG Len)
    {
        return ViewStart() <= Ofs && Ofs+Len-1 <= ViewEnd();
    }
    BOOL IsInvalid()
    {
        return Flags & SegInvalid;
    }
    void SetValid()
    }
        Flags |=  SegDirty;
        Flags &= ~SegInvalid;
    }
```

FIG. 8g

```
    void SetInvalid()
    {
        Flags &= ~SegDirty;
        Flags |= SegInvalid;
    }
    BOOL IsSelected(USHORT sel)
    }
        return Flags & self
    }

DdsCaSeg( );

DdsCaSeg( DdsCaChl *Chl, DWORDLONG SegOffset, ULONG SegLength, USHORT SegFlags
);

~DdsCaSeg( );

public:
    DdsCaSeg*        Next;      // next segment !!! MUST BE FIRST MEMBER OF CLASS !!!
    unsigned __int32  PageNum;   // map page number (### good up to 48 bit file sizes)
    unsigned __int16  Flags;     // segment flags
    unsigned __int64  Offset;    // offset in file corresponding to segment start
    unsigned __int32  Length;    // segment length
    unsigned __int32  MapLength; // map length
    void*            Vaddr;     // view address (page aligned)
}
    void             ReleaseSegment( DdsCaSeg **SegPP );

```
class CHANNEL : public DdsCaChl { public:

enum {
        DDS_OK = 0              // dds error codes
    };

CHANNEL( );

void    InvalidateChannel( );

void    DisconnectChannel( );

void    ReInitializeChannel( QUEUE_INDEX_T _cqx );

BOOL    FlushMetaDataToDiskCache( );

void    LoadMetaDataFromDiskCache( StagingChannel* MetaBufP );

CHANNEL*  AcquireChannel( MSG_SOURCE_T src, QUEUE_INDEX_T cqx );

int     ReleaseChannel( );

// Channel connection
//
CHANNEL     *mcp;               // memory channel ptr
DdsTime     MetaWriteTime;      // local time of last mete write // Channel state ...
//
DDS_COND_T  c_lock;             // channel lock ptr
DDS_TID     thread_id;          // id of thread that's got channel
u_long      c_flags;            // see defines below
u_long      c_state;            // see defines below
u_long      c_error;            // channel error code // Channel lists ...
//
CHANNEL     *fl_forw;           // free list ptrs
CHANNEL     *fl_back;
CHANNEL     *act_forw;          // active list ptrs
CHANNEL     *act_back;
CHANNEL     *dl_forw;           // dirty list ptrs
CHANNEL     *dl_back;

// Channel Times
//
DWORD       connect_time;       // dds_ticks: connection to dataset
DWORD       acquire_time;       // dds_ticks: channel acquisition
DWORD       dirty_time;         // dds_ticks: channel enqueued on DL
DWORD       active_time;        // dds_ticks: channel enqueued on AL
DWORD       attrs_time;         // dds ticks: last attrs LOAD
```

```
        u_char      service;         // list of required services
        QUEUE_INDEX_T  cqx;          // channel queue index if   DDS_CACHING_ATTRS == ENABLED
        DDS_NT_ATTR   attr;          // attributes
endif if   DDS_READ_AHEAD == ENABLED

DdsCaSeg    load_seg;        // service: segment to be LOADed
        USHORT      seq_count;       // channel sequential access count
        USHORT      rdm_count;       // channel random access count
        u_char      fzy_count;       // channel fuzzy access count
        u_char      prefetch_late;   // count of prefetches that were late
        u_char      prefetch_used;   // count of prefetches used
        u_char      prefetch_wasted; // count of prefetches never used
        CHANRATE    c_rate;          // rate of consumption
        CHANRATE    r_rate;          // rate of replenishment
endif void        ReturnSegments( );
        int         FlushChannel( long flush_level );
};

/************************************************************
 * Class Declaration: StagingChannel
 ************************************************************/

// There is a single global staging channel, protected by create_lock,
// that is used to load and flush all memory channels in transit to
// or from the disk cache.

class StagingChannel : public CHANNEL { public:

DdsCaSeg Segment[DDS_MAX_SEGS];
};
```

FIG. 8J

NDC CONSISTENCY RECONNECT MECHANISM

CLAIM OF PROVISIONAL APPLICATION RIGHTS

This application claims the benefit of U.S. Provisional Patent Application No. 60/033,462 filed on Dec. 17, 1996.

COPYRIGHT NOTICE

A portion of the disclosure of this patent document contains copyrighted material. The copyright owner hereby grants others a right to reproduce copies of the patent document or the patent disclosure exactly as it appears in the files of the United States Patent and Trademark Office, but otherwise reserves all copyright rights whatsoever.

BACKGROUND OF THE INVENTION

1. Field of the Invention

The present invention relates generally to networked digital computers, and, more particularly, distributed caching of digital data throughout the network of computers.

2. Description of the Prior Art

Present file systems for digital computers employ a wide range of caching mechanisms to accelerate performance. There are data caches, name caches, attribute caches, client caches, and many other kinds of caches. Clients receiving data from such caches via a network generally demand that the data be consistent with the original source data structure, although there are some applications where the clients don't require a very high degree of consistency. However, file systems clients usually want all the consistency that the file system can deliver.

There are two basic methods for maintaining consistency of data cached at remote sites, client-driven consistency, and server-driven consistency. In client-driven consistency, clients fetch the file-last-write-time attribute from the file server, a process that is frequently referred to colloquially as "pinging the server," and then compare that time with the file-last-write-time attribute associated with the cached data. Since the file-last-write-time attribute for the cached data was loaded into the cache at the same time as the cached data, if the times both at the file server and the client are the same, the file has not been modified since the cached data was fetched from the server, and the cached file data remains valid. If the times differ, the file has been modified so all cached file data is now invalid, must be discarded, and new file data fetched from the server.

Client-driven consistency provides weak consistency since the file may change just after the server has responded to a ping, and the client won't detect the file's change until the next ping.

While increasing the ping rate tightens the consistency, the improved consistency comes at the expense of reduced scalability. Moreover, with client-driven cache consistency the server's response to each client ping always reports the file's state at the moment the server processes the ping-request, and the data in the file may change immediately thereafter while the client is using the data. Consequently, regardless of how frequently the client pings the server, there always remains a window of uncertainty regarding the validity of remotely cached data.

For server-driven consistency, the file server monitors all clients accessing a file and tracks the types of operations (e.g. read or write) being performed by each client. Clients are allowed to cache data locally if no concurrent write sharing ("CWS") condition exists. (A CWS condition exists if multiple clients are active on a file and at least one of them is writing to the file.) If a server detects a CWS condition, it sends a message to all caching sites instructing them that:
  a) the cached file image is to be flushed back to the server if it contains modified data; and/or
  b) the file image which they are caching is to be invalidated.

Thus, if a CWS condition arises, all client caches are "turned off," and all client requests flow through to the server, where they are serviced from the file server's cache, which is common for all clients.

Server-driven consistency has an advantage in that it provides 'absolute' consistency so long as a server or network failure doesn't prevent a consistency message (e.g. RecallAndInvalidate or Invalidate message) from being delivered to the client. Server-driven consistency suffers from the disadvantage that it scales poorly to large networks that are distributed over a large geographic distance since the sever must keep track of every file being accessed.

One widely used Unix file system called Network File System ("NFS") employs the client-driven cache consistency method. NFS clients typically ping the file server every 3 seconds for every file that is in use. This pinging generates a substantial amount of network traffic and limits the scalability of NFS. In addition, NFS offers weak consistency semantics. Clients usually employ a file locking mechanism, such as Revision Control System ("RCS") or Source Code Control System ("SCCS"), that is external to NFS to avoid a concurrent write sharing condition. Furthermore, NFS client caches reside only in main memory and are managed on a least recently used ("LRU") basis. Consequently, the cache size is limited to the amount of memory available. NFS requires continual communication with the server for every file in use. The constant communication stream that binds clients to servers is not well suited for a network operating over a geographically large distance.

Another file system called Andrew File System ("AFS") caches files on the local disk of client systems. Whenever a file is opened, the client pings the server to determine if the cached file is current. If so, the cached file is used. If not, a new copy of the file is loaded (or at least the first "chunk" is loaded) before the open call returns to the calling program. AFS guarantees that the cached file is most likely current at the moment the open call returns. Once the open call returns, the client process uses the file with no additional communication with the server. AFS is highly scalable since clients only ping the server once each time a file is opened, but the consistency guarantee provided by AFS is very weak. AFS is very scalable in two ways. First, since files are re-validated each time they're opened, clients may cache an unlimited number of files. Second, since client machines only require a single ping to re-validate a file, and then no further server communication is required, the client machines may be distributed over a geographically very large area.

Later versions of a remote file system protocol named Server Message Block ("SMB") implement a server-driven "opportunistic locks" ("oplocks") mechanism. An SMB server grants clients permission to cache file data, monitors all file requests, and revokes caching privileges as required to ensure that all clients have exactly the same view of file data at any given instant. This method provides "absolute" consistency, which means that a read-request for a file always returns the most recently written data, except when a network failure prevents the server's oplock break message from being delivered to a client.

In principle, SMB allows clients to buffer (cache) file data only as long as the file is held open on the client machine. SMB's "batch oplock" allows a file to persist in the cache for a short interval after the last close. There may be multiple processes holding a file open on the client system, but even using batch oplocks shortly after the last process holding the file open closes the file, SMB invalidates all cached data associated with the file. Thus, clients are limited to caching only those files that are in active use (i.e. are being held open by one or more processes).

SMB does not support long term caching. This implies that whenever a file is initially opened at a client it must be fetched across the network which may be quite distant from the client. A file system capable of operating over geographically large distances must allow long-term (e.g. months or even years) file caching, and only transmit a copy of a file across the net if the cached copy becomes invalid.

The preceding comparison of client-driven and server-driven methods for maintaining cache consistency reveal that, presuming a reliable network interconnects a server and a client, server-driven methods maintain absolute consistency by monitoring all file traffic, detecting occurrence of CWS, and recalling/invalidating cached file images as required. Server-driven methods, such as SMB, do not require or use file time stamps. Conversely, client-driven methods are essentially strategies for accessing disconnected file images. NFS client caches continuously ping the server, (i.e. retrieve the file-last-write-time attribute) to re-validate cached file images. AFS clients ping the server only once when the file is opened, reload the cached file image if necessary, and then use the cached file image until the file is closed without additional consistency checking.

BRIEF SUMMARY OF THE INVENTION

An object of the present invention is to provide more efficient file caching at remote sites distributed over a large geographical area.

Another object of the present invention is to provide file servers with an ability to more efficiently maintain absolute file consistency over huge data caches at numerous remote sites.

Another object of the present invention is to avoid, if practicable and possible, retransmitting to a remote site a previously transmitted file.

Another object of the present invention is to reduce the burden on file servers for monitoring and maintaining file data consistency.

Another object of the present invention is to permit networked computers to continuously re-use files cached at a site remote from the file server until the file is modified at any other site in the network.

Another object of the present invention is to make practicable remote data storage of tens of gigabytes without unnecessarily burdening file servers from which the data originates.

Another object of the present invention is to break any connection between the number of consistent files that can be cached at remote sites and the burden placed on file servers from which the files originate.

Another object of the present invention is to more intelligently and efficiently exploit links between networked computers.

Briefly, the present invention is a Consistency Reconnect Mechanism ("CRM") which permits a caching site in a network of computers, that is remote from a file server at which a file originates, to determine:

1. if data of a previously cached but now inactive file remains valid; and
2. if the data in the file remains valid, to supply the data to a client without re-retrieving the file from the file's remote server.

In the network of digital computers the server employs server-driven consistency for maintaining consistency of any portion of the image of the file projected from the server to the caching site. The caching site supplies data from the image of the file to a client while the client is active on the file.

First, as the file becomes inactive at the caching site the CRM method saves in permanent storage at the caching site the image of the file projected into the caching site together with metadata for the file. Included in such metadata saved in permanent storage is a file-last-write-time attribute for the file while the file was active. Then, after the file has become inactive at the caching site and the image of the file projected into the caching site together with the metadata that includes the file-last-write-time attribute have been saved in permanent storage, if the caching site receives a subsequent file-open request from a client for the file the caching site retrieves from permanent storage at the caching site at least the file-last-write-time attribute. After retrieving the file-last-write-time attribute, the caching site compares the file-last-write-time attribute retrieved from permanent storage at the caching site with the file-last-write-time attribute now current at the server. If the file-last-write-time attribute retrieved from permanent storage at the caching site equals the file-last-write-time attribute now current at the server site, then the caching site first reconnects that portion of the projected image of the file present in permanent storage at the caching site. After reconnecting to that portion of the projected image of the file present in permanent storage at the caching site, then the caching site re-establishes server-driven consistency over that portion of the projected image of the file present in permanent storage at the caching site. Finally, after the caching site re-establishes server-driven consistency over that portion of the projected image of the file present in permanent storage at the caching site, then the caching site uses data from the image of the file that is retrieved from permanent storage at the caching site to respond to a subsequent read request from the client.

The CRM permits file servers to maintain absolute consistency over huge data caches at numerous remote sites, such as client workstations and/or other file servers that are servicing client workstations. The CRM also permits maintaining enormous amounts of cached data warehoused at remote sites while reducing the burden placed on the file server for monitoring and maintaining file data consistency. The CRM reduces the burden of monitoring and maintaining consistency on the file server by allowing cached file images to be disconnected from a file consistency mechanism and then, at some later time, to be reconnected to that mechanism, re-validated, and re-used. The disconnect/reconnect capability provided by CRM allows the server to forget about disconnected file images that are no longer active. CRM reduces the consistency burden on the sever from monitoring all files cached at a remote site to monitoring only those files that are currently in active use.

The ability of CRM to disconnect and then reconnect a consistency mechanism breaks the linkage between how much data the server must monitor and maintain, and the amount of data that can be cached at remote sites. Once the linkage between the server's monitoring and maintenance burden and the quantity of data cached at remote sites is broken, there exists almost no practical limit on the size or number of data warehouses that may be employed to accelerate access to data stored on file servers.

In addition to accelerated file access, links networking computers together are used more intelligently and efficiently. Using the CRM, files may be transferred across network links once, and then cached and re-used for weeks, months, or even years. Remotely cached file images may be continuously re-used until they are modified at any other site in the network, or they are discarded from the cache because they haven't been in active use for a very long time.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a block diagram illustrating a network of digital computers organized as a hierarchy of NDC sites that provide server-driven consistency to clients active on a file named foo;

FIG. 2 is a block diagram illustrating an alternative embodiment network of digital computers similar to that depicted in FIG. 1 in which an NT server provides server-driven consistency to clients through a hierarchy of NDC sites;

DETAILED DESCRIPTION

Figure 3B:
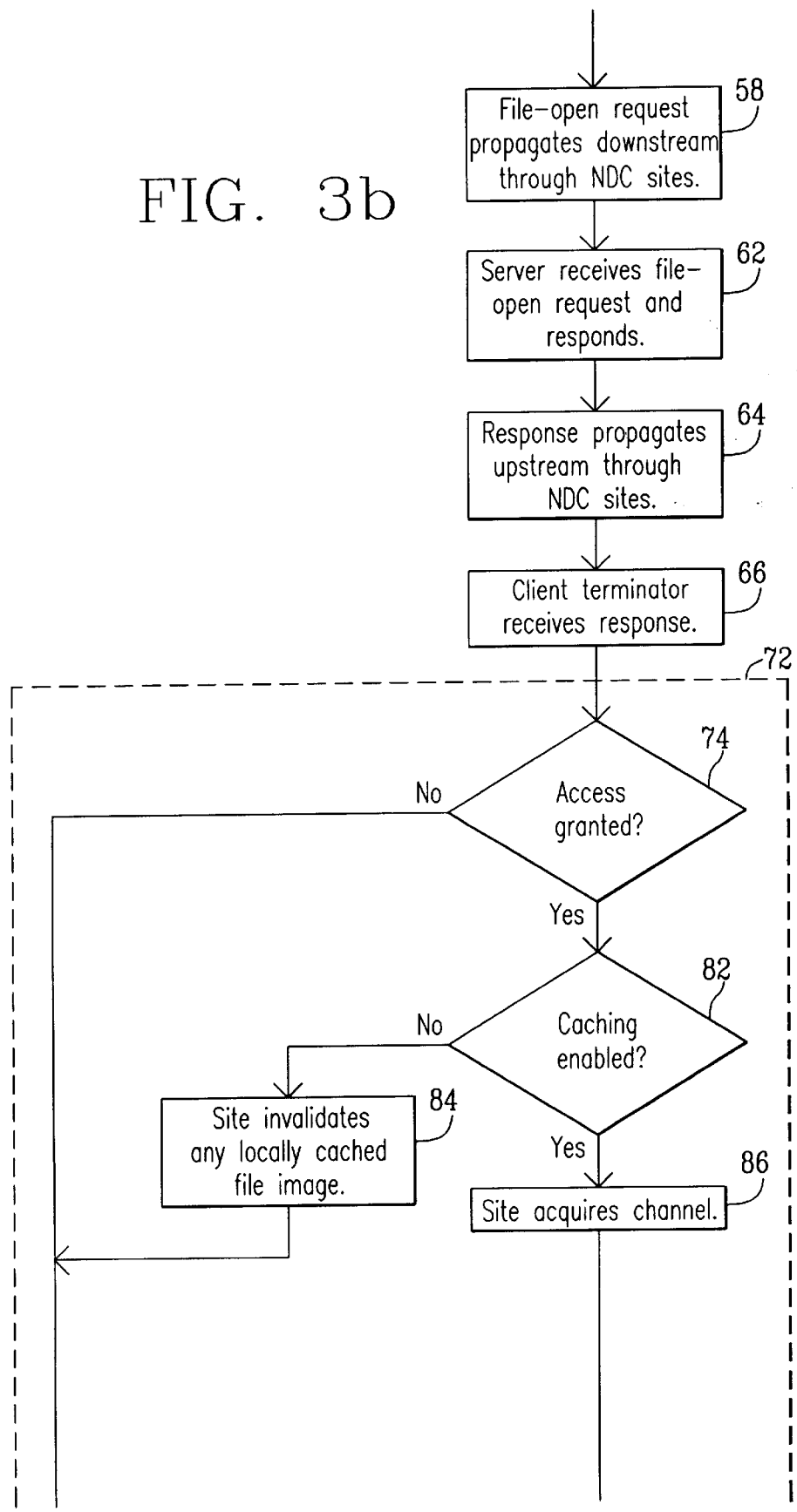
FIG. 3 depicts the relationship between FIGS. 3a, 3b and 3c, the combined FIGS. 3a–3c forming a decisional flow chart that illustrates how the computer network depicted in FIG. 2 operates in responding to a file-open request from a client.

A file caching methodology identified by the name Network Distributed Cache ("NDC"), that is described both in a Patent Cooperation Treaty ("PCT") International Publication Number WO 93/24890 and in U.S. Pat. No. 5,611,049 which issued Mar. 11, 1997, to the present applicant (collectively the "NDC patent"), provides a server-driven cache consistency mechanism that is distributed across a hierarchy of NDC caching sites. The text of the NDC patent is incorporated herein by reference. FIG. 1 depicts a hierarchy of NDC sites 22 A, B, C, E, and F via which clients 24 D, G, H and I access a file 26 named foo. Because the file foo 26 is at least being accessed at each NDC site 22 and is being used at each of the clients 24, it referred to as being "active" at the NDC sites 22 and clients 24. The existence of a NDC channel at an upstream NDC site that is referenced by a NDC channel at the next downstream NDC site defines an active file. As described in greater detail in the NDC patent, each NDC site 22 includes a digital computer that maintains at least NDC buffers and channels in random access memory ("RAM"), and preferably includes local permanent hard disk storage.

Within a hierarchy of NDC sites 22, site A is always referred to as the server terminator site for the file foo 26. NDC Site A "owns" the file foo 26. All other NDC sites 22 in the hierarchy are upstream (i.e. further from the data source) from NDC site A. For each request to access a file such as the file foo 26. the NDC site 22 that receives the client request is referred to as the client terminator NDC site 22, and any intervening NDC sites 22 between the client terminator NDC site 22 and the server terminator NDC site 22, such as the NDC sites 22 B and C, are referred to as intermediate NDC sites 22. In the illustration of FIG. 1, NDC sites B, E, and F are client terminator NDC sites 22. With respect to the client terminator NDC sites 22 B, E, and F, NDC sites B and C are intermediate NDC sites 22. If a local client requests that NDC site A read data from file foo 26, then NDC site A is simultaneously both a client terminator NDC site 22 and a server terminator NDC site 22.

NDC's distributed consistency mechanism operates as a "cascade-able opportunistic lock" mechanism. NDC site A monitors all upstream NDC sites 22 to which it connects directly (NDC sites 22 B and C in the illustration of FIG. 1), and enables caching in those NDC sites 22 using essentially the same method employed by SMB. However, NDC methodology extends caching beyond NDC sites 22 B and C by allowing, while a CWS condition does not exist among all the NDC sites 22 accessing file foo 26, any upstream NDC site 22 that's been granted caching privileges to pass its caching privilege upstream onto additional NDC sites 22 to which it connects directly. Following this recursive procedure, while a CWS condition does not exist, caching privileges eventually extend to all NDC sites 22 depicted in FIG. 1 when there are clients reading file foo 26 at clients 24 D, G, H, and I.

Upstream NDC sites 22 must always inform their respective downstream NDC site 22 of any new type of file access request (read or write) before servicing the request. Downstream NDC sites 22 maintain a list of their respective upstream NDC sites 22 for each file, and record the type of file access(es) being performed at each upstream NDC site 22. Consequently, if a downstream NDC site 22 receives a file-open request (which specifies the type of access desired) from one of its upstream NDC sites 22, the downstream NDC site 22 compares the new activity conditions existing at the downstream NDC site 22, and also at all of its other directly connected upstream NDC sites 22, to determine if a CWS condition has just occurred. If a CWS condition has just occurred, a single recall-message or one or more disable-messages are dispatched from the NDC site 22 detecting the CWS condition to all directly connected upstream NDC sites 22 except the NDC site 22 that sent the inform-message. Furthermore, whenever an upstream NDC site 22 reports a "new" activity on a file to the downstream NDC site 22, then the downstream NDC site 22 must issue its own inform-message to its downstream NDC site 22. This procedure continues recursively until the inform-message reaches either:

a) a NDC site 22 that's already performing the "new" type of activity, or b) the server terminator NDC site 22.

Eventually, the downstream NDC site 22 that received the original inform-message replies to the dispatching upstream NDC site 22. However, the downstream NDC site 22 does not dispatch a reply to the inform-message from the upstream NDC site 22 until:

a) replies have been received to all recall/disable-messages sent to the directly connected upstream NDC sites 22; and b) a reply has also been received to any inform-message dispatched to the downstream NDC site 22.

The reply-message from the downstream NDC site 22 that received the original inform-message conveys to the upstream NDC site 22 either CACHING_ENABLED or CACHING_DISABLED, depending on whether a CWS condition has occurred or not. If the downstream NDC site 22 dispatches a CACHING_DISABLED message, the upstream NDC site 22 that dispatched the original inform-message must:

a) flush any modified file data to the downstream NDC site 22; and b) then invalidate all cached data at the conclusion of the client request that is currently being processed.

As just described, the NDC implements a hierarchical cache consistency mechanism. This enables NDC caching to offer better scalability over large geographic distances than SMB. However the maximum number of files that can be concurrently cached from a single server with either SMB or NDC is about the same, since both SMB and NDC require that the server maintain a consistency connection for every remotely cached file.

FIG. 2 depicts a hierarchy of NDC sites 22 B, C, E, and F via which the clients 24 D, G, H and I access the file foo 26 supplied by an NT server 28. The NT server 28 does not implement the full NDC as described in the NDC patent, and therefore does not completely implement or support the NDC's hierarchical version of the oplock mechanism. However, because the NDC sites 22 are capable of transparently extending SMB's server-driven consistency oplock mechanism from the NT server 28 to the clients 24, the NDC sites 22 depicted in FIG. 2 can safely cache the file foo 26 locally at each NDC site 22 if the NT server 28 grants the clients 24 permission to buffer (cache) the file foo 26. However, as described above, SMB allows the clients 24 to cache the file foo 26 only as long as the file foo 26 is held open at the client 24. When the client 24 closes the file foo 26, SMB operating in the client 24 invalidates all cached data associated with the file foo 26 at that client 24.

Versions of Microsoft NT that supports Lanman 1.0 dialect equip SMB's server-driven consistency with three different categories of oplock mechanisms. SMB provides an exclusive oplock that allows a client 24 to open the file foo 26 for exclusive access, and allows the client 24 to perform arbitrary buffering (caching). If the NT server 28 grants the client 24 an exclusive oplock, the client 24 may buffer lock information, read-ahead data and write data on the client 24 because the client 24 is the only process active on the file foo 26. SMB also provides a batch oplock that allows a client 24 to keep the file foo 26 open on the NT server 28 even though the client process has closed the file. Batch oplocks are used where common programs on the client 24, such as a command processor, successively open and close the same file within a short interval. Finally, only in NT does SMB provide a level II oplock that indicates there are multiple client processes reading the file foo 26, and there is no client process writing the file foo 26, i.e. a CWS condition does not exit. Level II oplocks allow multiple clients 24 to be active on the file foo 26 concurrently and to buffer (cache) data locally while no client 24 is writing to the file foo 26. The level II oplock may be broken to none, if some client 24 that is active on the file foo 26 performs a write operation to the file foo 26, i.e. creates a CWS condition. Since a client 24 that has been granted a level II oplock is prohibited from buffering (caching) lock information, the file foo 26 is in a consistent state if the level II oplock is broken to none. Upon breaking a level II oplock, the buffering (caching) client 24 that created the CWS condition must flush its buffers (cache) and degrade to performing all operations on the file foo 26 across the network to the NT server 28.

While FIG. 2 depicts the NDC sites 22 as being distinct from the NT server 28, at least one NDC site 22 may be a provided by a process that, in fact, runs on the NT server 28. Consequently, each of the NDC sites 22 depicted in FIG. 2 may, in fact, be a process running on an NT server. Such an implementation of NDC caching permits effectively distributing, through the NDC sites 22, each NT server's files to all the other NT servers in the network.

File-Open Processing

Figure 3C:
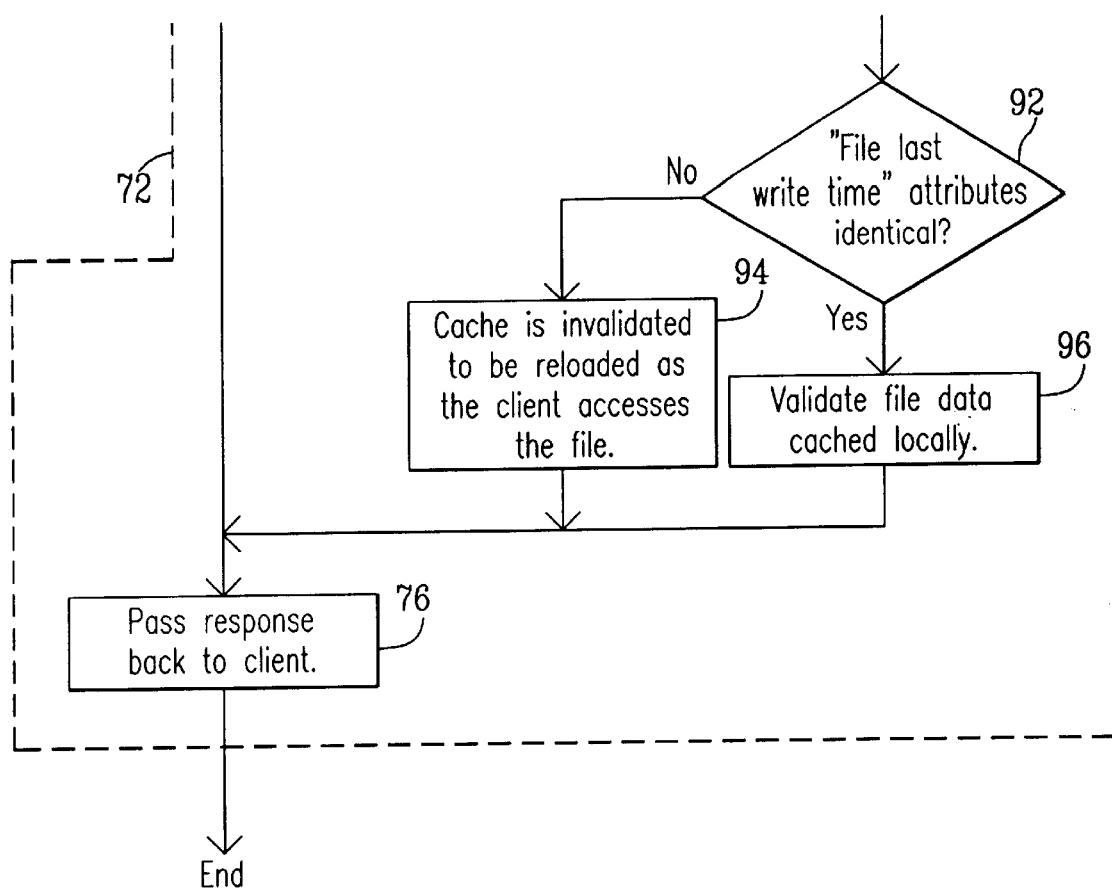
Figure 3:
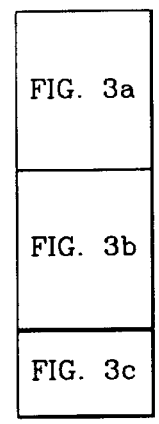
Figure 5:
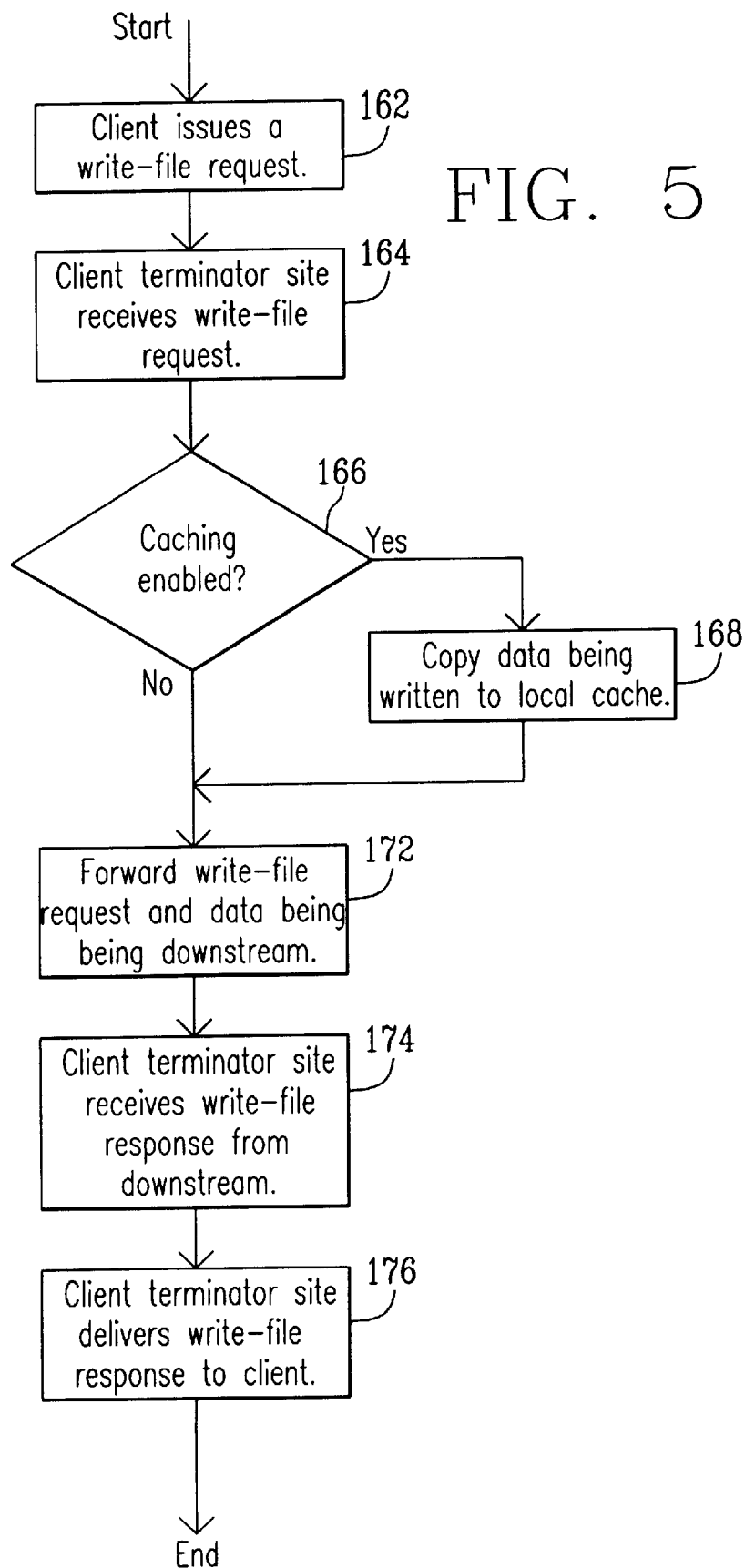
FIG. 5 depicts a decisional flow chart that illustrates how the computer network depicted in FIG. 2 operates in responding to a write request from a client.

FIGS. 3a–3c provide a decisional flow chart that illustrates how the computer network depicted in FIG. 2 operates in responding to a file-open request from any of the clients 24. In processing block 52 one of the clients 24, e.g. H, submits a file open-request for the file foo 26 to one of the NDC sites 22, i.e. F. The NDC site 22 F, which is the NDC client terminator site for the requesting client 24, in turn in decision block 54 issues an open-request (using a slightly modified filename) to the local file system where the NDC site 22 F maintains a cache of file images that may possibly include an image of the file foo 26. If the file images cached by the client 24 F lacks an image of the file foo 26, then in processing block 56 the NDC site 22 F dispatches a file-open request across the network toward the NT server 28. As indicated in processing block 58, the open-request may traverse one or more NDC intermediate sites, but it eventually arrives at the server terminator site which, in the illustration of FIG. 2, is the NT server 28. The NT server 28 in processing block 62 receives the file-open request from the server terminator NDC site 22 C and responds. The response in processing block 64 propagates upstream through NDC sites 22 C and F. In processing block 66 the client terminator NDC site 22 F receives the response from the NT server 28 which includes the value of the file-last-write-time attribute for the file foo 26.

As indicated by a dashed line 72, each NDC site 22 iteratively processes the response from the NT server 28 as follows. If in decision block 74 the response from the NT server 28 denies access to the file foo 26, then in processing block 76 the NDC sites 22 C and F successively pass the response back to the client 24 H after which file-open processing ends. If the NT server 28 permits access to the file foo 26, but if the SMB oplock in the response from the NT server 28 prohibits the client 24 from buffering (caching) the file foo 26, caching is disabled in decision block 82 and then in processing block 84 the NDC site 22 C or F invalidates any locally cached file image. After invalidating any locally cached file image, the NDC site 22 C or F in processing block 76 passes the response back to the client after which file-open processing ends.

If in decision block 82 the SMB oplock response from the NT server 28 permits the client 24 to buffer (cache) the file foo 26, then in processing block 86 the NDC site 22 C or F acquires the least recently used ("LRU") NDC channel for storing metadata for the file foo 26 if such a channel has not already been acquired as explained in greater detail below. The combined FIGS. 8a–8i present a computer program listing written in the C programming language setting forth a data structure for the NDC channel. In decision block 92 the NDC sites 22 C and F respectively compare the file-last-write-time attribute for the channel with the file-last-write-time attribute in the response from the NT server 28 which the NDC site 22 F received in processing block 66. If no data is cached for the file foo 26 at the NDC site 22, then the file-last-write-time attribute for the channel will not match the file-last-write-time attribute in the response from the NT server 28. If the file-last-write-time attribute for the channel differs from the file-last-write-time attribute in the response from the NT server 28, then in processing block 94 the NDC sites 22 C and F respectively invalidate any cached file image and prepare to reload the cache as the NDC site 22 H accesses the file foo 26. If, as explained in greater detail below, an image was cached for the file foo 26 at the NDC site 22 but the cached file image has a file-last-write-time attribute that differs from the file-last-write-time attribute in the response from the NT server 28, then the NDC sites 22 C and F also perform processing block 94 thereby invalidating any cached file image and preparing to reload the cache as the NDC site 22 H accesses the file foo 26. Conversely, if as explained in greater detail below, the file-last-write-time attribute in the channel matches the file-last-write-time attribute in the response from the NT server 28, then in processing block 96 the NDC sites 22 C and F respectively validate the file image cached locally on permanent disk storage. Regardless of whether the NDC site 22 C or F performs processing block 94 or 96, the NDC site 22 C or F in processing block 76 passes the response back to the client and ends file-open processing.

If in decision block 54 the local file system's response to the open-request (using a slightly modified filename) from the NDC site 22 F or C finds an image of the file foo 26 cached locally, then the local file system returns a file handle to the NDC site 22 F or C. Using the file handle returned from the local file system, in processing block 102 the NDC site 22 F or C reads the previously stored channel from permanent disk storage into a staging buffer and extracts a pointer to a NDC channel that may still be present in random access memory ("RAM"). If in decision block 104 the NDC site 22 F or C using the channel pointer is unable to connect to a NDC channel in RAM, then in processing block 106 the NDC site 22 F or C acquires the LRU channel, and stores the metadata for the file foo 26, previously retrieved into the staging buffer from permanent disk storage, into the LRU channel located in RAM. Having restored metadata for the file foo 26 to a channel in RAM, the NDC site 22 F or C then attempts to determine if the image of the file foo 26 in the local cache is valid by performing processing block 56 which dispatchs a file-open request across the network toward the NT server 28.

If in decision block 104 the NDC site 22 F or C using the channel pointer connects to a channel in RAM, then if the NDC site 22 F or C in decision block 108 finds that the RAM resident channel is inactive, the NDC site 22 F or C then attempts to determine if the image of the file foo 26 in the local cache is valid by performing processing block 56 which dispatchs a file-open request across the network toward the NT server 28. Conversely, if in decision block 108 the NDC site 22 F or C finds the RAM resident channel is active, then in processing block 112 the NDC site 22 C responds to the client 24 and the file-open process ends because the NDC site 22 F or C has found that the file foo 26 is active at an NDC site.

Read Processing

Figure 4B:
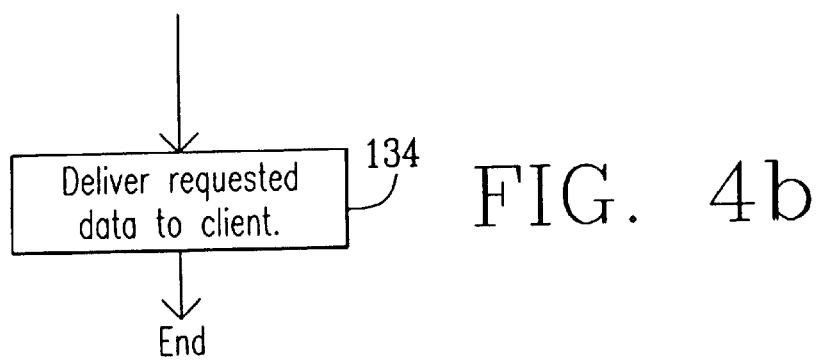
FIG. 4 depicts the relationship between FIGS. 4a and 4b, the combined FIGS. 4a and 4b forming a decisional flow chart that illustrates how the computer network depicted in FIG. 2 operates in responding to a read request from a client.

After the file foo 26 has been opened in any of the ways described above, the client 24 H may, as depicted in processing block 122 of FIG. 4, issue a read-file request to the client terminator NDC site 22 F which receives the read-file request in processing block 124. Upon receiving the read-file request from the client 24, the NDC site 22 F in decision block 126 ascertains whether the SMB oplock issued by the NT server 28 permitted buffering (caching) at the client 24. If buffering (caching) at the client 24 is enabled, the NDC site 22 F in processing block 128 retrieves from the local cache any data available there that satisfies the read-file request. If in decision block 132 the NDC site 22 determines that all of the requested data was retrieved from the local cache, then in processing block 134 the NDC site 22 delivers to the client 24 H the data requested in the read-file request thereby ending read-file request processing.

If in decision block 126 the NDC site 22 F determines that caching is not enabled, or if in decision block 132 the NDC site 22 F determines that not all of the requested data was retrieved from the local cache, then in processing block 142 the NDC site 22 requests any missing data from the immediately downstream NDC site 22. Subsequently in processing block 144 the client 24 receives any missing data from the downstream NDC site 22. Upon receiving the missing data from the downstream NDC site 22, the NDC site 22 F in decision block 146 ascertains whether the SMB oplock issued by the NT server 28 permitted buffering (caching) at the client 24. If buffering (caching) at the client 24 is disabled, the NDC site 22 F proceeds to processing block 134 in which the NDC site 22 delivers to the client 24 H the data requested in the read-file request. If buffering (caching) at the client 24 is enabled, then in processing block 148 the NDC site 22 copies the new data retrieved from the downstream NDC site 22 to the local cache. After copying the new data to the local cache, the NDC site 22 F proceeds to processing block 134 in which the NDC site 22 delivers to the client 24 H the data requested in the read-file request.

While the preceding description of read-file request processing by the NDC site 22 specifically presents operation of the NDC site 22 F, it is readily apparent that identical processing at the NDC site 22 C with the NDC site 22 F replacing the client 24 H, and with the NT server 28 replacing the downstream NDC site 22 effects a transfer either:

1. of images of cached data from the file foo 26 to the NDC site 22 F from the NDC site 22 C, or
2. of data from the file foo 26 at the NT server 28 through the NDC site 22 C to the NDC site 22 F.

Write Processing

After the file foo 26 has been opened in any of the ways described above, the client 24 H may, as depicted in processing block 162 of FIG. 4, issue a write-file request to the client terminator NDC site 22 F which receives the write-file request in processing block 164. Upon receiving the write-file request from the client 24, the NDC site 22 F in decision block 166 ascertains whether the SMB oplock issued by the NT server 28 permitted buffering (caching) at the client 24. If buffering (caching) at the client 24 is enabled, the NDC site 22 F in processing block 168 the NDC site 22 copies the data being written to the local cache. Regardless of whether or not the SMB oplock issued by the NT server 28 permitted buffering (caching) at the client 24, in processing block 172 the NDC site 22 forwards the write-file request together with the data to be written downstream toward the NT server 28. Subsequently, in processing block 174 the client 24 receives a write-file response from the downstream NDC site 22.

After receiving the write-file response from the downstream NDC site 22, the client terminator NDC site 22 F delivers the write-file response to the client 24 H thereby ending write-file request processing.

While the preceding description of write-file request processing by the NDC site 22 specifically presents operation of the NDC site 22 F, it is readily apparent that identical processing at the NDC site 22 C with the NDC site 22 F replacing the client 24 H, and with the NT server 28 replacing the downstream NDC site 22 C effects a transfer of data being written by the client 24 H to the file foo 26 through the NDC sites 22 F and C to the NT server 28.

Oplock Break Processing

Figures 6, 6A, 6B:
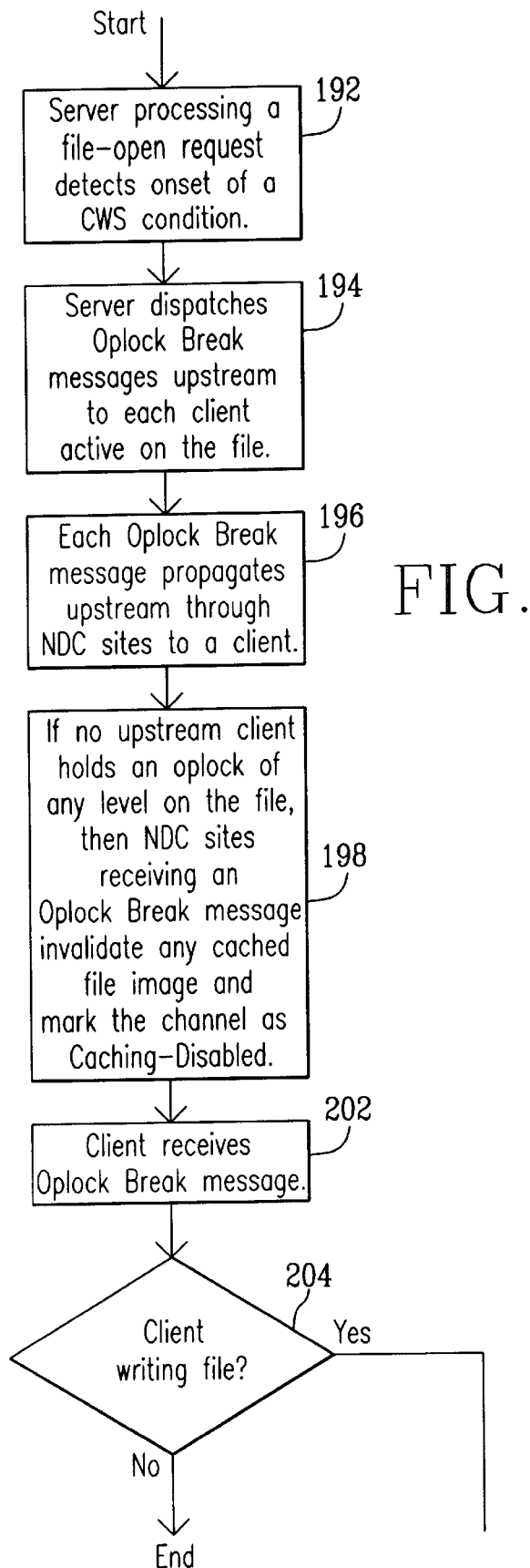
FIG. 6 depicts the relationship between FIGS. 6a and 6b, the combined FIGS. 6a and 6b forming a decisional flow chart that illustrates how the computer network depicted in FIG. 2 operates in responding to an oplock break message from the NT server.
Figure 6B:
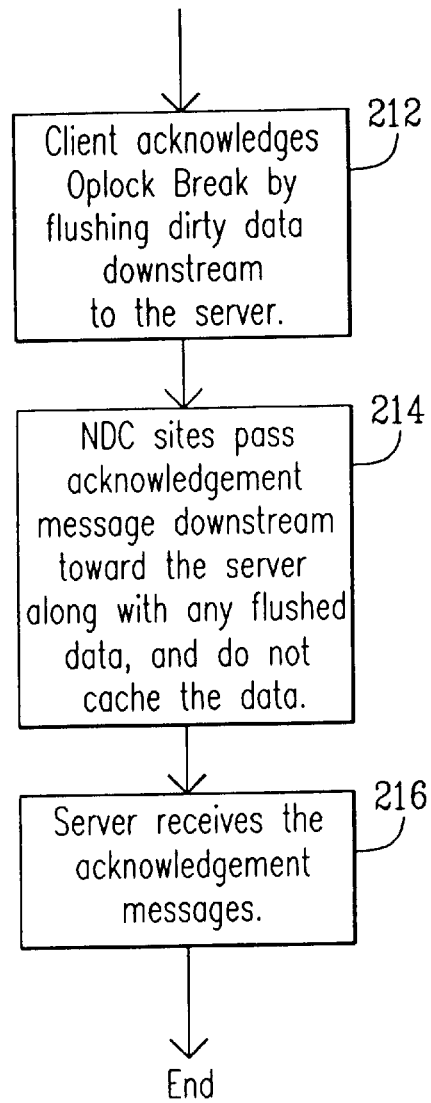

The NT server 28 in processing a file-open request in processing block 192 of FIGS. 6a and 6b may detect onset of a CWS condition, i.e. at least two clients 24 active on the file foo 26 and at least one of them is attempting to write to the file foo 26. In response to detecting onset of a CWS condition, the NT server 28 in processing block 194 dispatches an oplock break message upstream to each client 24 that is active on the file foo 26. In processing block 196 each oplock break message propagates upstream through NDC sites 22 to a client 24. In addition to passing the oplock break message upstream to the next NDC site 22 or to the client 24, in processing block 198 if no upstream client 24 holds an oplock of any level on the file foo 26, then the NDC sites 22 receiving the oplock break message invalidate any locally cached file image, and mark their channel for file foo 26 as caching-disabled.

In processing block 202 the client 24 receives the oplock break message dispatched from the NT server 28. If the client 24 is not writing the file foo 26 in decision block 204, then receipt of the oplock break message by the client 24 ends oplock break message processing. However, if the client 24 receiving the oplock break message was writing the file foo 26, then in processing block 214 the client 24 acknowledges the oplock break message by flushing the dirty data for the file foo 26 downstream to the NT server 28 through the NDC sites 22. NDC sites 22 receiving the dirty data for the file foo 26 and the oplock break acknowledgement message from the client 24 in processing block 214 pass the acknowledgement message downstream toward the NT server 28 along with any flushed data, and do not copy the data to their local caches (which have been disabled). Finally, in processing block 216, the NT server 28 receives any oplock break acknowledgement message and any flushed data to end processing of the oplock break message.

File-Close Processing

Figure 7B:
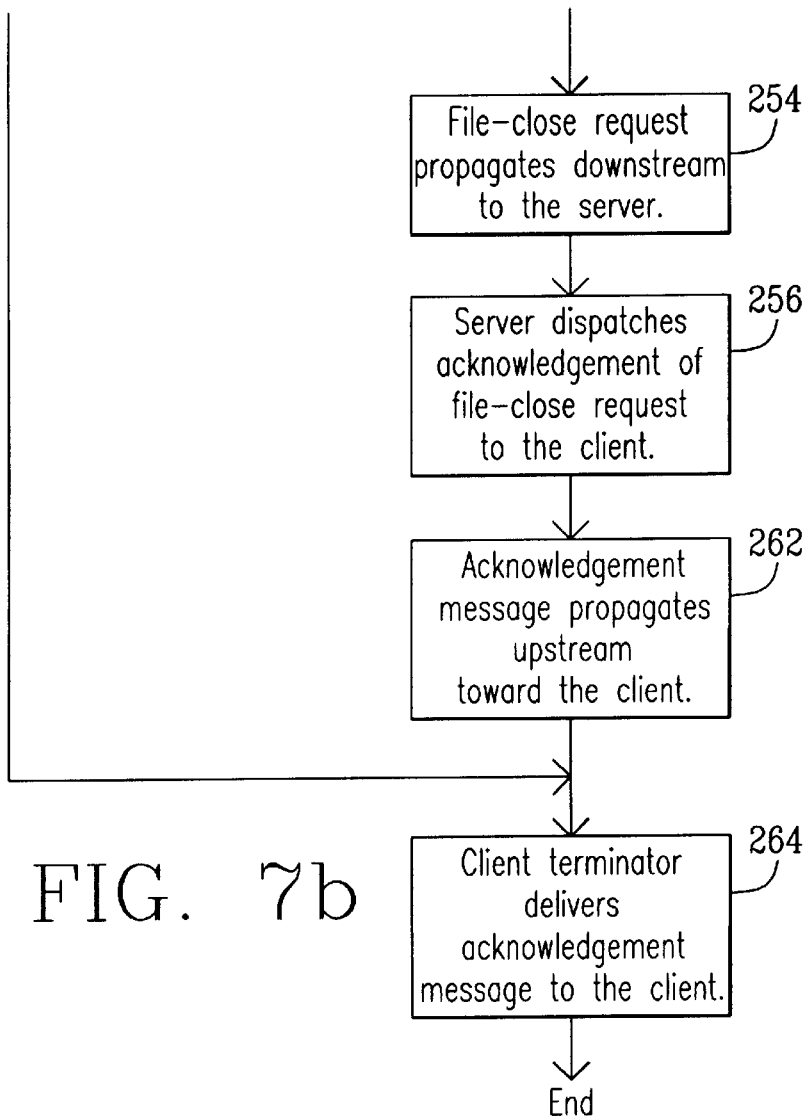
FIG. 7 depicts the relationship between FIGS. 7a and 7b, the combined FIGS. 7a and 7b forming a decisional flow chart that illustrates how the computer network depicted in FIG. 2 operates in responding to a file-close request from a client.
Figure 8:
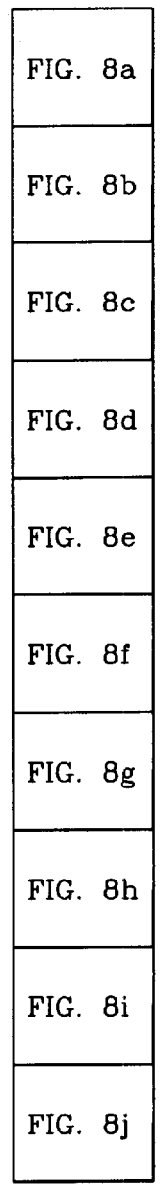
FIG. 8, depicts the relationship between FIGS. 8a through 8j, the combined FIGS. 8a–8j presenting a computer program listing written in the C programming language setting forth a data structure for a channel that is used by the NDC sites depicted in FIGS. 1 and 2.

FIGS. 7a and 7b provide a decisional flow chart that illustrates how the computer network depicted in FIG. 2 operates in responding to a file-close request from any of the clients 24. In processing block 232 a client 24, such as the client 24 H, issues a file-close request to the client terminator NDC site 22 F. The NDC site 22 F in decision block 233 determines if any other client 24 is active on the file foo 26. If no other client 24 is active on the file foo 26, in processing block 234 the client terminator NDC site 22 F synchronizes the data cached locally on permanent disk storage for the file foo 26 with the image of the file foo 26 in the RAM of the NDC site 22 F. In synchronizing the images of the file foo 26, the client terminator NDC site 22 F writes the present state both of the data and of metadata for the file file foo 26 from RAM to permanent disk storage. The metadata cached locally on permanent disk storage includes the file-last-write-time attribute. If the client terminator NDC site 22 F in decision block 236 determines that the file foo 26 has been written by this client, then in processing block 242 the NDC site 22 sends a set file-last-write-time attribute request downstream to the NT server 28. The set file-last-write-time request specifies the same value for the file-last-write-time attribute that the NDC site 22 F has stored in the metadata cached locally on permanent disk storage in processing block 234. In processing block 244 the NDC site 22 H receives from the NT server 28 a response to the set file-last-write-time request.

Regardless of whether the client 24 H has or has not written the file foo 26, in processing block 252 the client terminator dispatches a file-close request to the NT server 28. In processing block 254 the file-close request propagates downstream through NDC sites 22, such as the NDC site 22 C, which, if no other client 24 is active on the file at the NDC site 22, synchronize the data and metadata cached locally on permanent disk storage for the file foo 26 as described above for processing block 234. In processing block 256 the NT server 28 dispatches a message acknowledging the file-close request to the client 24 H. In processing block 262 the acknowledgement message dispatched by the NT server 28 propagates upstream toward the client 24 H until reaching the client terminator NDC site 22 F. If another client 24 is found to be active on the file foo 26 in decision block 233 or if a file-close request has been sent to the NT server 28, in processing block 264 the client terminator NDC site 22 F delivers the file-close acknowledgement message to the client 24 H thus ending file-close request processing.

CRM described above using the NDC sites 22 represents a hybrid method for maintaining consistent data caches at remote sites. The CRM augments the server-driven consistency mechanism supplied by SMB operating in the NT server 28, which maintains "absolute" consistency on all active cached file images, with a client-driven reconnect mechanism that enables a disconnected (inactive) cached file image to be re-validated and "hooked back into" the SMB server-driven consistency mechanism.

Although the present invention has been described in terms of the presently preferred embodiment, it is to be understood that such disclosure is purely illustrative and is not to be interpreted as limiting. For example, NT's NTFS protocol provides a file-last-change-time attribute which, if available, is preferred in comparison with NT's file-last-write-time attribute. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a network of digital computers that includes a caching site which supplies data from an image of a file to a client while the client is active on the file, the network of digital computers employing server-driven consistency for maintaining consistency of any portion of the image of the file projected from a server site to the caching site; a method for reconnecting to, revalidating the consistency of, and using the image of the file cached at the caching site after the file has become inactive at the caching site, the method comprising the steps of:

(a) as the file becomes inactive at the caching site, saving in permanent storage at the caching site the image of the file projected into the caching site together with metadata for the file that includes a file-last-write-time attribute for the file while the file was active; and (b) after the file has become inactive at the caching site and the image of the file projected into the caching site together with the metadata that includes the file-last-write-time attribute have been saved in permanent storage, upon the caching site receiving a subsequent file-open request from a client for the file:

i. retrieving from permanent storage at the caching site at least the file-last-write-time attribute;

ii. comparing the file-last-write-time attribute retrieved from permanent storage at the caching site with the file-last-write-time attribute now current at the server site; and iii. if the file-last-write-time attribute retrieved from permanent storage at the caching site equals the file-last-write-time attribute now current at the server site:

A. reconnecting to that portion of the projected image of the file present in permanent storage at the caching site;

B. re-establishing server-driven consistency over that portion of the projected image of the file present in permanent storage at the caching site; and C. using data from the image of the file that is retrieved from permanent storage at the caching site to respond to a subsequent read request from the client.

2. The method of claim 1 wherein in comparing the file-last-write-time attribute retrieved from permanent storage at the caching site with the file-last-write-time attribute now current at the server site, the method further comprises the steps of:

A. forwarding a file-open request for the file from the caching site to the server site; and B. receiving from the server site a response to the file-open request that grants the client access to the file, the response including the file-last-write-time attribute now current at the server site.

* * * * *